United States Patent
Deng et al.

(10) Patent No.: US 12,340,051 B2
(45) Date of Patent: Jun. 24, 2025

(54) DISPLAY PANEL, DRIVING METHOD THEREOF, AND DISPLAY DEVICE

(71) Applicant: Tianma Micro-Electronics Co., Ltd., Shenzhen (CN)

(72) Inventors: Zhibin Deng, Shenzhen (CN); Jian Li, Shenzhen (CN); Lituan Wang, Shenzhen (CN); Jianfeng Zhu, Shenzhen (CN); Banghu Luo, Shenzhen (CN)

(73) Assignee: Tianma Micro-Electronics Co., Ltd., Shenzhen (CN)

( * ) Notice: Subject to any disclaimer, the term of this patent is extended or adjusted under 35 U.S.C. 154(b) by 0 days.

(21) Appl. No.: 18/416,664

(22) Filed: Jan. 18, 2024

(65) Prior Publication Data

US 2024/0353957 A1    Oct. 24, 2024

(30) Foreign Application Priority Data

Apr. 19, 2023   (CN) .......................... 202310435096.3

(51) Int. Cl.
*G06F 3/041*   (2006.01)
*G06F 3/044*   (2006.01)

(52) U.S. Cl.
CPC ........ *G06F 3/04184* (2019.05); *G06F 3/0412* (2013.01); *G06F 3/0443* (2019.05); *G06F 3/0446* (2019.05)

(58) Field of Classification Search
None
See application file for complete search history.

(56) References Cited

U.S. PATENT DOCUMENTS

| | | | |
|---|---|---|---|
| 2013/0050130 A1* | 2/2013 | Brown | G06F 3/04184 |
| | | | 345/174 |
| 2022/0326797 A1* | 10/2022 | Kida | G06F 3/0412 |
| 2023/0040857 A1* | 2/2023 | Krah | G06F 3/044 |

FOREIGN PATENT DOCUMENTS

| | | |
|---|---|---|
| CN | 103649881 A | 3/2014 |
| CN | 105528124 A | 4/2016 |
| CN | 110471568 A | 11/2019 |

* cited by examiner

*Primary Examiner* — Duane N Taylor, Jr.
(74) *Attorney, Agent, or Firm* — Anova Law Group, PLLC (57) ABSTRACT

A display panel includes a first driving circuit; a display electrode layer, and a touch electrode layer. The first driving circuit is configured to obtain a display electrode signal from the display electrode layer and generate a touch electrode signal provided to the touch electrode layer according to the display electrode signal. A potential jump position of the display electrode signal is in an off-stage of the touch electrode signal.

20 Claims, 10 Drawing Sheets

DISPLAY PANEL, DRIVING METHOD THEREOF, AND DISPLAY DEVICE

CROSS-REFERENCE TO RELATED APPLICATION

This application claims priority to Chinese Patent Application No. 202310435096.3, filed on Apr. 19, 2023, the entire content of which is incorporated herein by reference.

TECHNICAL FIELD

The present disclosure relates to the field of display technology and, in particular, to a display panel, a driving method thereof, and a display device.

BACKGROUND

As an important part of a display device, a display panel is used to realize a display function of the display device. Liquid crystal display (LCD) is the most common display panel. With the rapid development of the display panel, the display panel is increasingly applied in various technical fields. A touch function is an indispensable function of the display device including a portable display device and an in-car display device.

A touch electrode in the display panel is located very close to a display electrode (a common electrode and a pixel electrode). When in use, a display signal of the display electrode is usually an AC square wave signal, such as 5V voltage, 200 Hz frequency, and periodically switching between high and low levels, i.e., switching the polarity of the voltage. In the moment the display signal is switched between the high and low levels, the display signal will cause strong interference to a touch signal and generate significant noise, resulting in a technical problem of low touch signal-to-noise ratio.

SUMMARY

Embodiments of the present disclosure provide a display panel. The display panel includes a first driving circuit, a display electrode layer, and a touch electrode layer. The first driving circuit is configured to obtain a display electrode signal of the display electrode layer and generate a touch electrode signal provided to the touch electrode layer according to the display electrode signal. A potential jump position of the display electrode signal is in off-stage of the touch electrode signal.

Embodiments of the present disclosure provide a display device, including a display panel. The display panel includes a first driving circuit, a display electrode layer, and a touch electrode layer. The first driving circuit is configured to obtain a display electrode signal of the display electrode layer and generate a touch electrode signal provided to the touch electrode layer according to the display electrode signal. A potential jump position of the display electrode signal is in off-stage of the touch electrode signal.

Embodiments of the present disclosure provides a driving method of the disclosed display panel. The driving method includes obtaining the display electrode signal of the display electrode layer and generating the touch electrode signal, provided to the touch electrode layer, according to the display electrode signal, where the potential jump position of the display electrode signal is in off-stage of the touch electrode signal.

BRIEF DESCRIPTION OF THE DRAWINGS

In order to better illustrate the technical solutions of embodiments of the present disclosure, the following description will briefly introduce the accompanying drawings that are used in the embodiments. Obviously, the accompanying drawings in the following description are only some embodiments of the present disclosure. Those persons of ordinary skill in the art can also obtain other drawings based on the illustrated drawings without inputting creative efforts.

DETAILED DESCRIPTION OF THE EMBODIMENTS

Features and exemplary embodiments of various aspects of the present disclosure will be described in detail below. In the following detailed description, numerous specific details are set forth in order to provide a comprehensive understanding of the present disclosure. It will be apparent, however, to persons of ordinary skill in the art that the present application could be practiced without some of these specific details. The description of the embodiments below is only intended to illustrate examples of the present application for a better understanding thereof.

It should be noted that, unless otherwise conflicting, the embodiments and features described in some embodiments of the present disclosure can be combined with each other.

Embodiments of the present disclosure will be described in detail below in conjunction with the accompanying drawings.

It should be understood that when describing the structure of a component, when referring to one layer or region as being "above" or "on top of" another layer or region, it could mean directly above or on top of another layer or region, or it could include other layers or regions between the layer and another layer or region. Furthermore, if the component is flipped, the layer or region will be located "below" or "underneath" another layer or region.

In addition, the term "and/or" in the present disclosure simply a way of describing the relationship between associated objects, indicating that there may be three relationships, for example, A and/or B may represent the following three situations: A exists alone, both A and B exist, and B exists alone. In addition, the character "/" in the present disclosure generally represents an "or" relationship between the associated objects before and after it.

It should be understood that various modifications and changes can be made in the present disclosure without departing from the spirit or scope of the present disclosure, which would be apparent to those persons of ordinary skill in the art. Accordingly, the present disclosure is intended to cover modifications and changes falling within the scope of the corresponding claims the technical solution to be protected and their equivalents. It should be noted that the embodiments provided in the present disclosure can be combined with each other as long as they are not contradictory.

Figure 1:
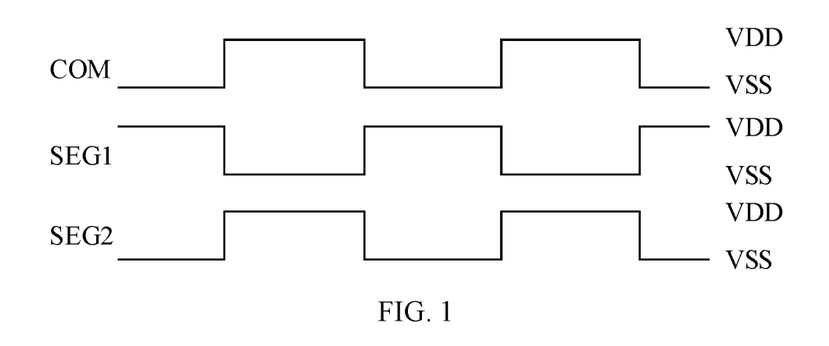
FIG. 1 illustrates a driving waveform diagram of a display panel.

A touch electrode of a display panel is located very close to a display electrode (a common electrode and a pixel electrode). During operation, a common electrode signal is typically an AC square wave signal, for example, a voltage of 5V and a frequency of 200 Hz, depicted as the COM waveform in FIG. 1. A pixel electrode signal is also an AC square wave signal, as shown in the SEG1 and SEG2 waveforms in FIG. 1. The common electrode signal and the pixel electrode signal periodically switch between the high level VDD and the low level VSS, thereby switching a voltage polarity. At the moment when the common electrode signal or the pixel electrode signal is switched between high and low levels, a strong interference is induced to a touch signal, resulting in significant noise and a low touch signal-to-noise ratio, which is addressed by the present disclosure.

The present disclosure provides a display panel, a driving method thereof, and a display device, which can turn off a touch electrode signal at the potential jump position of a display electrode signal. The touch electrode signal avoids the moment of high and low potential jumping or being influenced by the high and low potential jumping of the display electrode signal during the display process. Thus, this approach effectively reduces noise interference, improves the touch signal-to-noise ratio, and enhances touch sensitivity.

The display panel, the driving method thereof, and the display device provided by embodiments of the present disclosure will be exemplarily described below with reference to the accompanying drawings.

Figure 2:
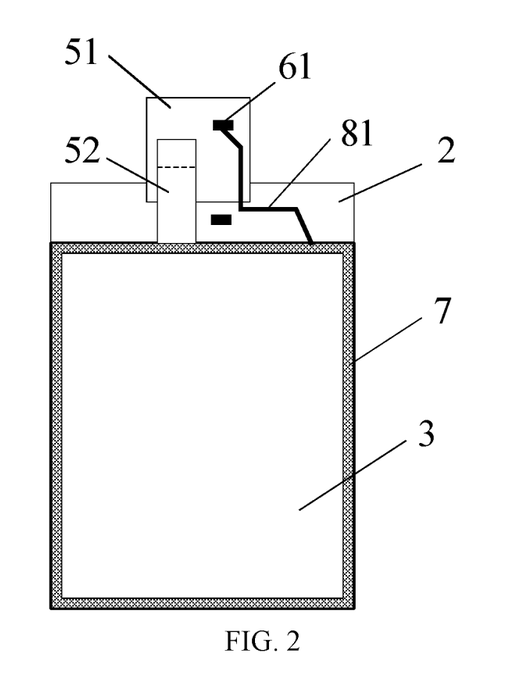
FIG. 2 illustrates a schematic plan view of a display panel provided by embodiments of the present disclosure.
Figure 3:
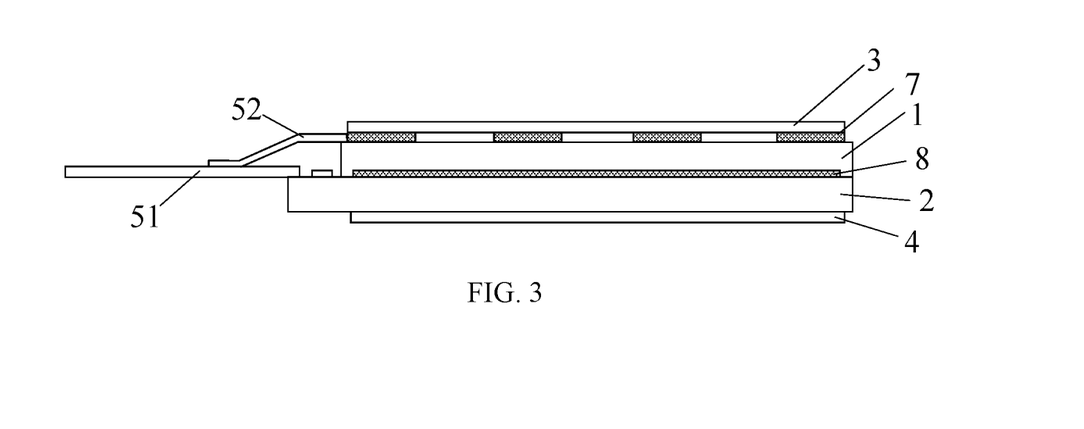
FIG. 3 illustrates a schematic cross-sectional view of a display panel provided by embodiments of the present disclosure.

FIG. 2 is a schematic plan view of a display panel provided by embodiments of the present disclosure. FIG. 3 is a schematic cross-sectional view of a display panel provided by embodiments of the present disclosure. The display panel includes a first substrate 1, a second substrate 2, an upper polarizer 3, a lower polarizer 4, and a primary flexible printed circuit (FPC) 51, and a first driving circuit 61 for touch scanning. The first driving circuit 61 is usually located on the primary FPC 51. A touch electrode layer 7 is arranged between the first substrate 1 and the upper polarizer 3. The first driving circuit 61 is connected to the touch electrode layer 7 through a touch FPC 52. A display electrode layer 8 is arranged between the first substrate 1 and the second substrate 2. The first driving circuit 61 is configured to obtain the display electrode signal of the display electrode layer 8. According to the display electrode signal, a touch electrode signal, provided to the touch electrode layer 7, is generated. The primary FPC 51 is mainly used to transmit a signal for displaying an image to the display panel, that is, a display electrode signal. The touch FPC 52 is arranged to transmit the touch electrode signal to the touch electrode layer 7. The display electrode signal is an AC square wave signal, which is periodically switched between high and low potentials. A potential jump position of the display electrode signal is in the off-stage of the touch electrode signal. According to the obtained display electrode signal, the first driving circuit 61 can turn off the touch electrode signal at the potential jump position of the display electrode signal, causing the touch electrode signal to avoid the moment when the display electrode signal is switched between high and low potentials. Therefore, the potential jump of the display electrode signal during the display process will not affect the touch electrode signal, which effectively reduces the noise signal interference, improves the touch signal-to-noise ratio, and enhances the touch sensitivity.

In some embodiments, the display electrode layer 8 includes a common electrode layer and a pixel electrode layer. The display electrode signal that the first drive circuit 61 needs to obtain includes a common electrode signal provided to the common electrode layer, a pixel electrode signal provided to the pixel electrode layer, or a common electrode signal and a pixel electrode signal obtained by the first driving circuit 61. Based on the different internal structures and driving methods of the display panel, in some embodiments, the display panel mainly has the common electrode signal interfere with the touch electrode signal. In some embodiments, the display panel mainly has the pixel electrode signal interfere with the touch electrode signal. In some embodiments, the display panel has both the common electrode signal and the pixel electrode signal interfere with the touch electrode signal.

In some embodiments, as shown in FIG. 2 and FIG. 3, the display panel includes a display electrode connection line 81. The display electrode layer 8 is electrically connected to the first driving circuit 61 through the display electrode connection line 81. The first driving circuit 61 obtains the display electrode signal of the display electrode layer 8 through the display electrode connection line 81. The first driving circuit 61 can obtain the display electrode signal of the display electrode layer 8 in real time through the display electrode connection line 81. The touch electrode signal is turned off at the potential jump position of the display electrode signal, causing the touch electrode signal to avoid the moment when the display electrode signal switches between high and low potentials.

In some embodiments, the display electrode connection line 81 includes a common electrode signal line. The common electrode layer is electrically connected to the first driving circuit 61 through the common electrode signal line. In some embodiments, a display panel mainly has the common electrode signal interfere with the touch electrode signal. For example, if the distance between the touch electrode layer and the common electrode layer is narrow, or the potential of the common electrode layer needs to be frame-inverted, the common electrode signal line is used to electrically connect the common electrode layer through the first driving circuit 61, causing the first driving circuit 61 obtain the common electrode signal of the common electrode layer in real time through the common electrode signal line.

In some embodiments, the display electrode connection line 81 includes a pixel electrode signal line, and the pixel electrode layer is electrically connected to the first driving circuit 61 through the pixel electrode signal line. In some embodiments, a display panel mainly has the pixel electrode signal interfere with the touch electrode signal. For example, if the distance between the touch electrode layer and the pixel electrode layer is narrow or the potential of the pixel electrode layer needs to be frame-inverted, the pixel electrode signal line can be used to electrically connect the pixel electrode layer to the first driving circuit 61, causing the first driving circuit 61 obtain the pixel electrode signal of the pixel electrode layer in real time through the pixel electrode signal line.

Figure 4:
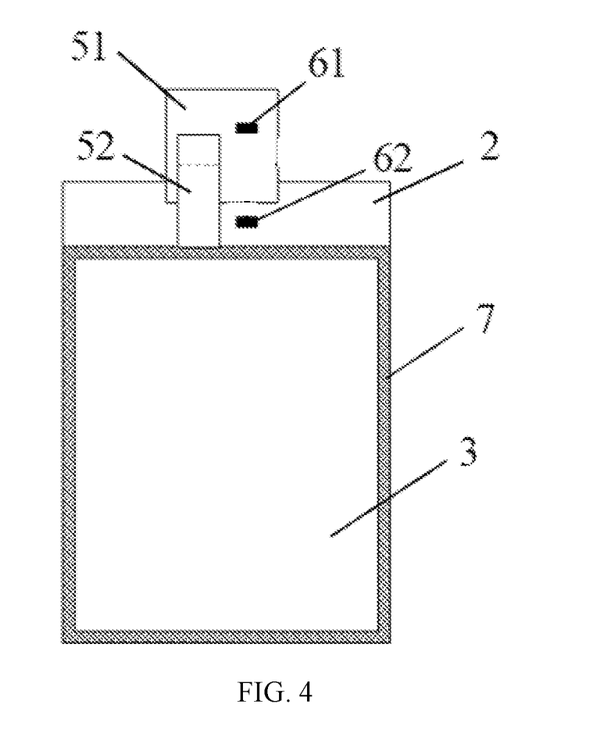
FIG. 4 illustrates a schematic plan view of a display panel provided by embodiments of the present disclosure.

FIG. 4 is a schematic plan view of a display panel provided by embodiments of the present disclosure. The display panel further includes a second driving circuit 62 for generating a display electrode signal that is provided to the display electrode layer 8. For example, the second driving circuit 62 can be arranged on the non-display area of the second substrate 2. The second driving circuit 62 can be electrically connected to the first driving circuit 61, for example, through the primary FPC 51. The first driving circuit 61 obtains the display electrode signal of the display electrode layer 8 through the second driving circuit 62. The second driving circuit 62 can synchronize the display electrode signal to the first driving circuit 61. The first driving circuit 61 can obtain the moment when the potential jump of the display electrode signal occurs, turning off the touch electrode signal at the potential jump position of the display electrode signal and making the touch electrode signal avoid the moment the display electrode signal is switched between high and low levels.

Figure 5:
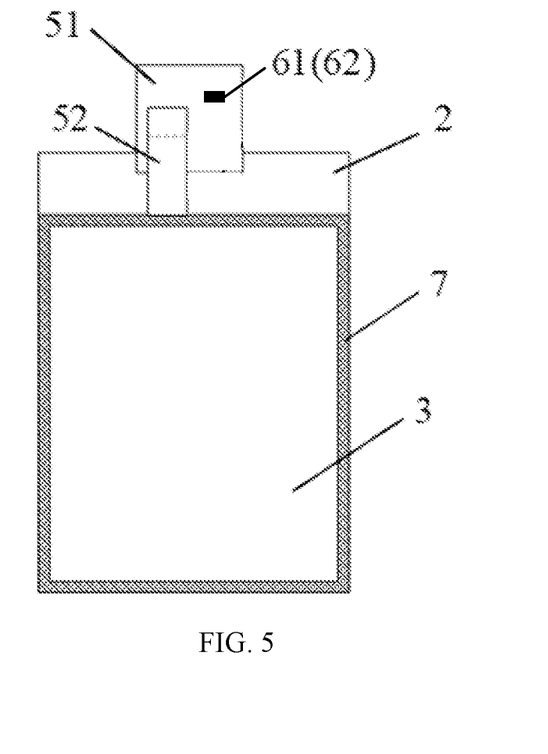
FIG. 5 illustrates a schematic plan view of a display panel provided by embodiments of the present disclosure.

FIG. 5 is a schematic plan view of a display panel provided by embodiments of the present disclosure. The display panel includes a second driving circuit 62 for generating a display electrode signal that is provided to the display electrode layer 8. The first driving circuit 61 can be integrated with the second drive circuit 62, i.e., the first driving circuit 61 and the second driving circuit 62 can be regarded as being integrated into an integrated circuit. The integrated circuit is used to generate the display electrode signal that is provided to the display electrode layer 8. The integrated circuit also generates the touch electrode signal that is provided to the touch electrode layer 7. Therefore, the first driving circuit 61 can obtain the moment when the potential jump of the display electrode signal occurs, turning off the touch electrode signal at the potential jump position of the display electrode signal. By this means, the touch electrode signal avoids the moment the display electrode signal is switched between the high and low levels.

Figure 6:
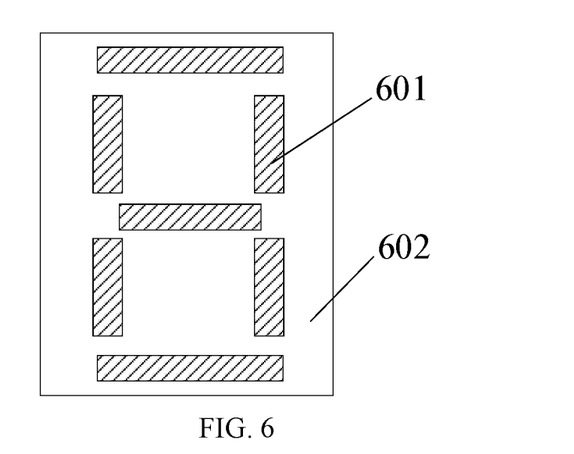
FIG. 6 illustrates a schematic diagram of a circuit structure of a display panel provided by embodiments of the present disclosure.
Figure 7:
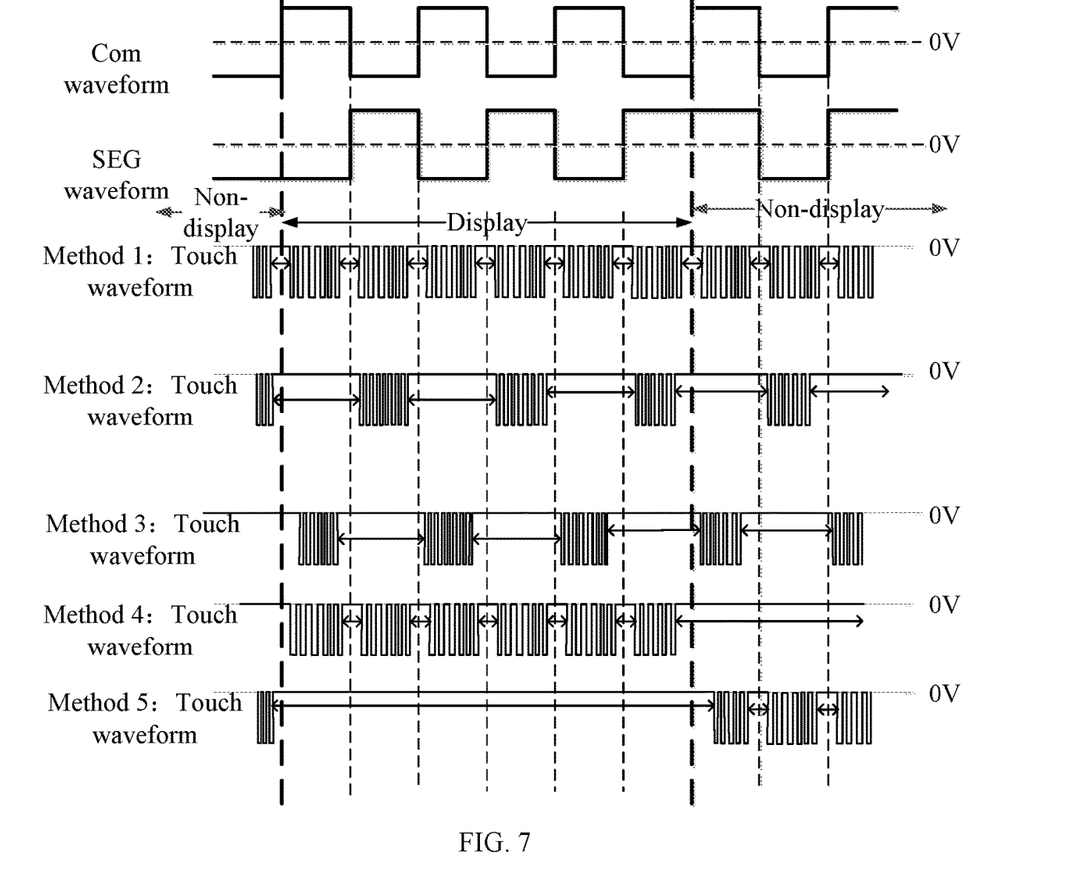
FIG. 7 illustrates a driving waveform diagram of a display panel provided by embodiments of the present disclosure.

FIG. 6 is a schematic diagram of a circuit structure of a display panel provided by embodiments of the present disclosure. FIG. 7 is a driving waveform diagram of a display panel provided by embodiments of the present disclosure. The pixel electrode layer includes a plurality of first electrodes 601 configured to form a first pattern. The common electrode layer includes a plurality of second electrodes 602 configured to form a second pattern. The overlapping area of the first electrode 601 and the second electrode 602 defines a preset display icon that is a static passive driving panel structure. The static passive driving is a way to drive the first electrode 601 (a segment electrode) one-by-one or all at the same time. Each first electrode 601 and second electrode 602 (the common electrode) have its independent driving circuit element. A voltage is only applied between the first electrode 601 and the second electrode 602 during the time requiring display. In the partial area shown in FIG. 6, a preset display icon of the number "8" is formed by the overlapping area of seven first electrodes 601 and one second electrode 602. When displaying an image, a common voltage is applied to the second electrode 602, and a driving voltage is applied to each first electrode 601 at the same time, realizing the display of the number "8". Since each first electrode 601 has an independent driving circuit element, only a part of the first electrodes 601 may be applied with the driving voltage, which will be displayed as other numbers or characters.

As shown in FIG. 7, the driving signal (SEG waveform) of the segment electrode and the driving signal (COM waveform) of the common electrode are square wave pulses with the same waveform. In a display state, a phase difference between the SEG waveform and the COM waveform is half a cycle, forming a voltage difference to drive the liquid crystal. In a non-display state, the phase difference is 0.

The touch electrode signal can be driven by many different methods. In some embodiments, the first driving circuit is configured to control the on-stage of the touch electrode signal in a high-level stage and a low-level stage of the display electrode signal. As shown in the Touch waveform of method 1 in FIG. 7, the touch electrode signal is applied when the common electrode is in the high-level stage and the segment electrode is in the low-level stage or the common electrode is in the low-level stage and the segment electrode is in the high-level stage.

In some embodiments, the first driving circuit is configured to control the on-stage of the touch electrode signal in the low-level stage of the display electrode signal. As shown in the Touch waveform of method 2 in FIG. 7, only the potential of the common electrode is used as a reference for the display electrode signal, and the touch electrode signal is applied during the low-level stage of the common electrode (or the high-level stage of the segment electrode).

In some embodiments, the first driving circuit is configured to control the on-stage of the touch electrode signal in the high-level stage of the display electrode signal. As shown in the Touch waveform of method 3 in FIG. 7, only the potential of the common electrode is used as a reference for the display electrode signal, and the touch electrode signal is applied during the high-level stage of the common electrode (or the low-level stage of the segment electrode).

In some embodiments, the first driving circuit is configured to control the on-stage of the touch electrode signal in the high-level stage and the low-level stage of the display electrode signal in the display state. As shown in the Touch waveform of method 4 in FIG. 7, in the display state, the touch electrode signal is applied during the high-level stage of the common electrode and the low-level stage of the segment electrode, or during the low-level stage of the common electrode and the high-level stage of the segment electrode.

In some embodiments, the first driving circuit is configured to control the on-stage of the touch electrode signal in the high-level stage or the low-level stage of the display electrode signal in the display state. In the display state, the touch electrode signal is applied during the high-level stage of the common electrode (or the low-level stage of the segment electrode), or during the low-level stage of the common electrode (or the high-level stage of the segment electrode).

In some embodiments, the first driving circuit is configured to control the on-stage of the touch electrode signal in the high-level stage and the low-level stage of the display electrode signal in the non-display state. As shown in the Touch waveform of method 5 in FIG. 7, in the non-display state, the touch electrode signal is applied during the high-level stage of the common electrode and the low-level stage of the segment electrode, or during the low-level stage of the common electrode and the high-level stage of the segment electrode.

In some embodiments, the first driving circuit is configured to control the on-stage of the touch electrode signal in the high-level stage or the low-level stage of the display electrode signal in the non-display state. In the non-display state, the touch electrode signal is applied during the high-level stage of the common electrode (or the low-level stage of the segment electrode), or during the low-level stage of the common electrode (or the high-level stage of the segment electrode).

Figure 8:
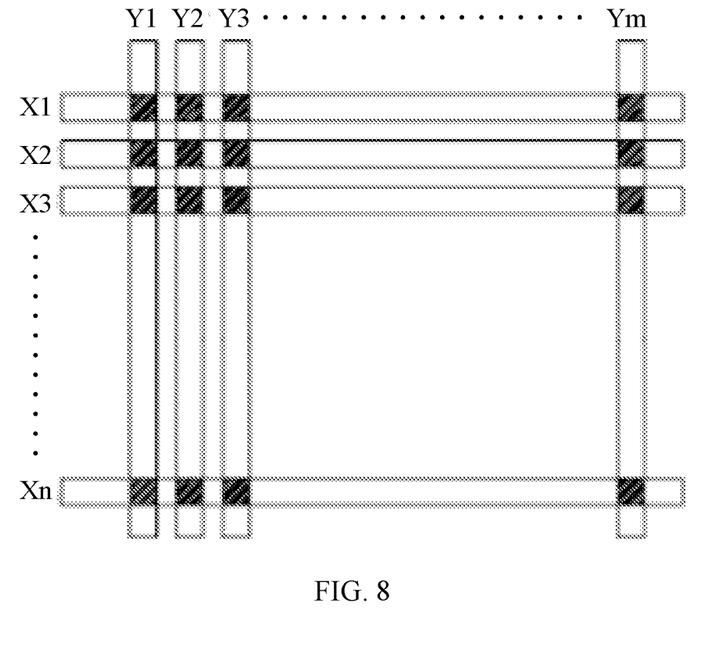
FIG. 8 illustrates a schematic diagram of a circuit structure of a display panel provided by embodiments of the present disclosure.
Figure 9:
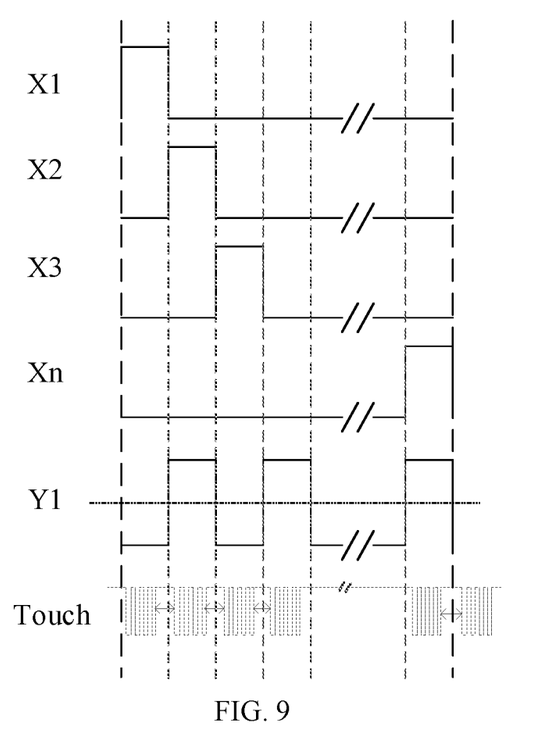
FIG. 9 illustrates a driving waveform diagram of a display panel provided by embodiments of the present disclosure.

FIG. 8 is a schematic diagram of a circuit structure of a display panel provided by embodiments of the present disclosure. FIG. 9 is a driving waveform diagram of a display panel provided by embodiments of the present disclosure. The pixel electrode layer includes a plurality of first electrodes Y1, Y2, Y3 . . . . Ym extending along a first direction. The common electrode layer includes a plurality of second electrodes X1, X2, X3 . . . . Xn extending along the second direction. The first direction intersects with a second direction. An overlapping area of the first electrode and the second electrode defines a pixel unit. The display panel is a passive matrix driving panel structure. The passive matrix driving method is composed of pixel electrodes along the vertical direction and common electrodes along the horizontal direction. Selecting the part of the passive matrix driving panel structure to be driven is controlled by the common electrodes along the horizontal direction, and the pixel electrodes along the vertical direction is responsible for driving the liquid crystal molecules. For example, in Twisted Nematic (TN) type and Super Twisted Nematic (STN) type LCD, an adopted method of driving an electrode is all based on a vertical crossing method. The passive matrix driving method is shown in FIG. 8 and FIG. 9, consisting of n transparent strip row electrodes (common electrodes) and m strip column electrodes (pixel electrodes). Pixels formed by m×n intersections are driven by m+n circuits. Since multiple pixels are connected on one strip electrode, the applied voltage becomes a time-division pulse, i.e., each pixel is subjected to a certain period of intermittent voltage excitation. Generally, the row electrode is scanned row by row at a frame rate above 30 Hz, as shown in the X1, X2, X3 . . . . Xn waveforms in FIG. 9. A bright signal and a dark signal are applied synchronously to the column electrodes, as shown in the Y1 waveform in FIG. 9. This driving method is called multi-channel (time division) driving, or passive matrix driving.

The driving method of the touch electrode signal is shown in FIG. 9. The common electrode scans line-by-line, and each common electrode outputs a square wave signal one-by-one. The pixel electrode synchronously outputs square wave signal. The rising edge and falling edge (high-low potential switching) of each square wave signal will cause interference to the touch electrode signal. Therefore, the first driving circuit turns off the touch electrode signal at the rising edge and falling edge of each square wave signal, as shown in the Touch waveform in FIG. 9, causing the touch electrode signal to avoid the moments the common electrode signal and the pixel electrode signal are switched between high and low potentials.

Figure 10:
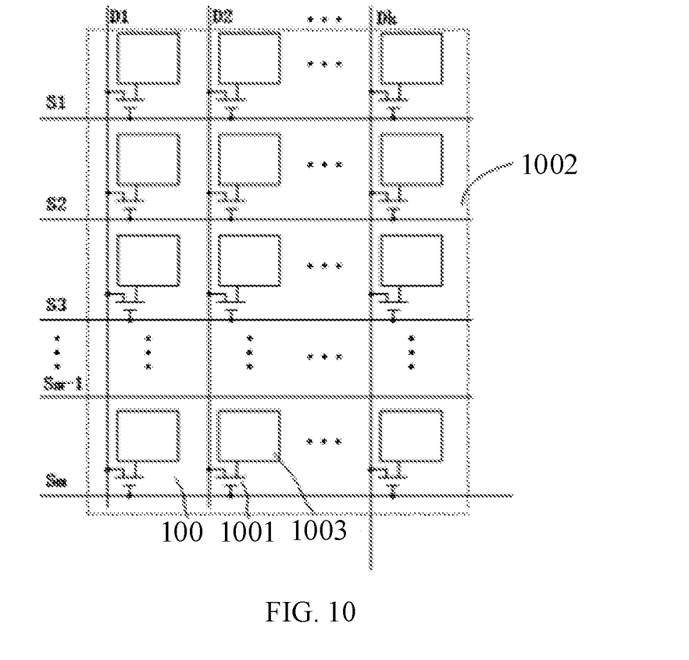
FIG. 10 illustrates a schematic diagram of a circuit structure of a display panel provided by embodiments of the present disclosure.
Figure 11:
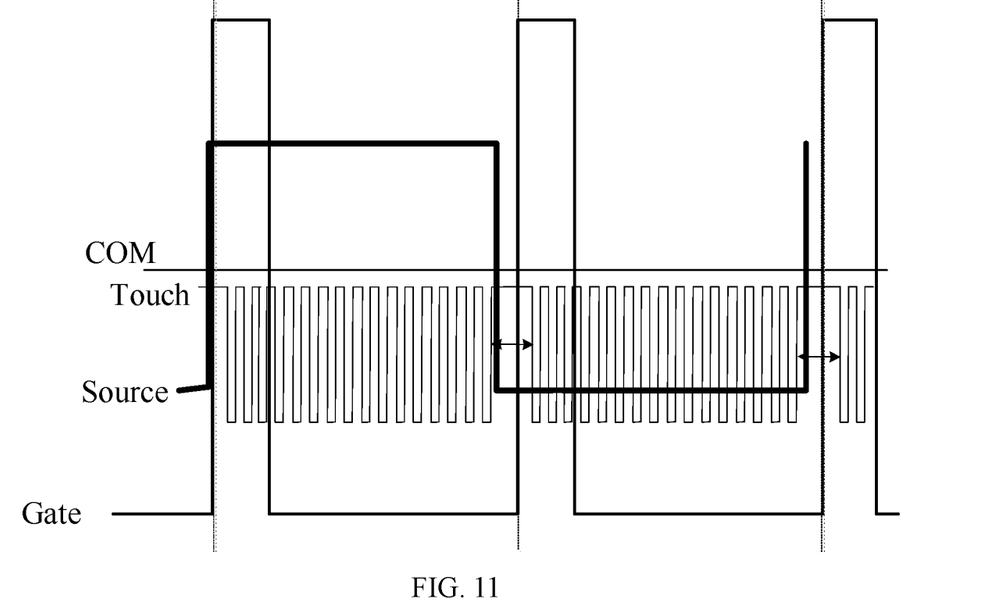
FIG. 11 illustrates a driving waveform diagram of a display panel provided by embodiments of the present disclosure.

FIG. 10 is a schematic diagram of a circuit structure of a display panel provided by embodiments of the present disclosure, and FIG. 11 is a driving waveform diagram of a display panel provided by embodiments of the present disclosure. The display panel includes a plurality of gate signal lines S1, S2, S3 . . . . Sm and a plurality of data signal lines D1, D2 . . . . Dk, forming a plurality of pixel units 100 arranged in a matrix. A pixel unit 100 includes a pixel circuit 1001, a common electrode 1002 of the common electrode layer, and a pixel electrode 1003 of the pixel electrode layer; The gate signal line turns on the pixel circuit 1001 row-by-row. The pixel electrode 1003 receives a pixel electrode signal from the data signal line through the pixel circuit 1001.

The driving method of the touch electrode signal is shown in FIG. 11. Each gate signal line outputs a square wave signal one-by-one, as shown in the Gate waveform in FIG. 11, and each data signal line outputs a pixel electrode signal synchronously. The polarity of the pixel electrode signal is reversed each frame, i.e., the high and low levels are switched each frame, as shown in the Source waveform in FIG. 11. The common electrode signal (for a short time) remains unchanged, as shown in the COM waveform in FIG. 11, forming a potential difference between the pixel electrode and the common electrode to drive the liquid crystal. In addition, according to actual needs, the common electrode signal can be set to reverse the polarity of each frame. High and low levels are switched for each frame, or set to multi-frame polarity reversal, switching high and low levels each fixed number of frames. The setting in FIG. 11 is multi-frame polarity reversal. Within a short period of time as shown in FIG. 11, the common electrode signal does not switch between high and low levels. As both the common electrode signal and the pixel electrode signal will interfere with the touch electrode signal, the first driving circuit needs to obtain the common electrode signal and turn off the touch electrode signal at the potential jump position of the common electrode signal. Driving the touch electrode signal avoids the moment the pixel electrode signal and the common electrode signal are switched between high-low levels, as shown in the Touch waveform in FIG. 11. When the pixel electrode signal and the common electrode signal are at a stable high level or low level, touch scanning is performed to avoid the moment the common electrode signal and the pixel electrode signal are switched between high and low levels.

Figure 12:
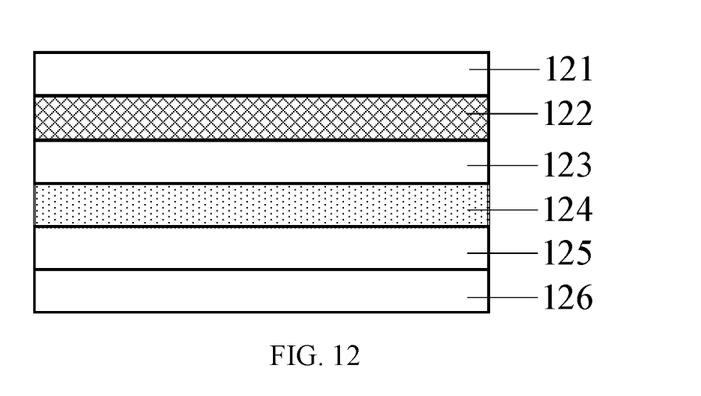
FIG. 12 illustrates a schematic cross-sectional view of a display panel provided by embodiments of the present disclosure.

FIG. 12 is a schematic cross-sectional view of a display panel provided by embodiments of the present disclosure. The display panel includes a first substrate (a color filter substrate) 123, a second substrate (a thin film transistor substrate) 125 opposing to the first substrate 123, and a liquid crystal layer 124 located between the first substrate 123 and the second substrate 125. A touch electrode layer 122 is located on a side of the first substrate 123 away from the second substrate 125. The display panel further includes an upper polarizer 121 and a lower polarizer 126, and the touch electrode layer 122 is located between the first substrate 123 and the upper polarizer 121. The display panel is an Oncell touch structure, embedding the touch electrode layer between the color filter substrate and the upper polarizer of the display panel, which only requires to form a relatively simple pattern of the touch electrode layer between the color filter substrate and the upper polarizer.

Thus, it is easy to ensure the yield. In addition, the effective display area of the display panel will not be reduced by the touch electrode layer, and there will be almost no image quality degradation.

In some embodiments, the panel includes the first and second substrates opposed to each other, and a liquid crystal layer located between the first and second substrates. The touch electrode layer is located between the first substrate and the second substrate. The display panel is an In-cell touch structure, and the touch electrode layer is embedded between the color filter substrate and the thin film transistor substrate of the display panel, integrating the originally external touch electrode layer with the display panel as well as realizing a thin and lightweight display panel.

Figure 13:
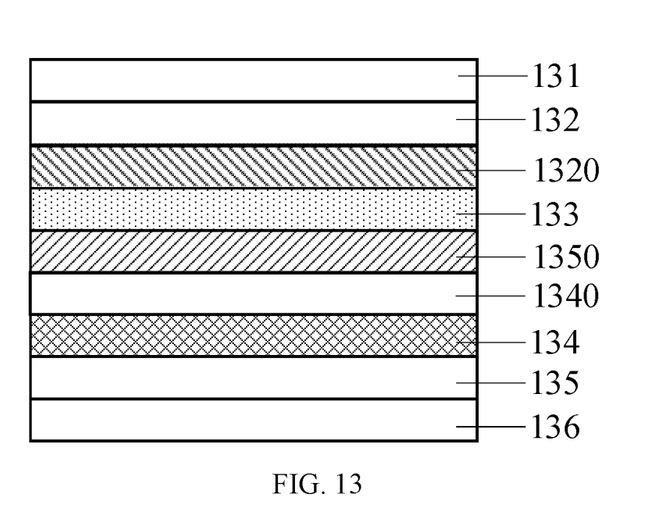
FIG. 13 illustrates a schematic cross-sectional view of a display panel provided by embodiments of the present disclosure.

Optionally, the touch electrode layer, for example, is located on the second substrate and on a side of the second substrate facing the first substrate, as shown in FIG. 13. FIG. 13 is a schematic cross-sectional view of a display panel provided by embodiments of the present disclosure. The display panel includes a first substrate (a color filter substrate) 132, a second substrate (a thin film transistor substrate) 135 opposing to the first substrate 132, and a liquid crystal layer 133 located between the first substrate 132 and the second substrate 135. The touch electrode layer 134 is located on the second substrate 135 and on a side of the second substrate 135 facing the first substrate 132. Embodiments of the present disclosure does not limit the specific setting of the common electrode and the pixel electrode in the display panel. In addition, the relationship of the layer order between the touch electrode layer, the common electrode, and the pixel electrode can also be set according to the design requirements of the practical product. For example, FIG. 13 exemplarily sets a common electrode layer 1320 formed on the first substrate 132, a pixel electrode layer 1350 formed on the second substrate 135. The touch electrode layer 134 is located on a side of the pixel electrode layer 1350 facing the second substrate 135. An insulating layer 1340 is formed between the touch electrode layer 134 and the pixel electrode layer 1350. The display panel further includes an upper polarizer 131 and a lower polarizer 136.

The touch electrode layer 134 of the display panel is formed on the second substrate 135. The pixel electrode layer 1350 is also formed on the second substrate 135. The touch electrode layer 134 is closest to the pixel electrode layer 1350. Thus, it is mainly the pixel electrode signal that interferes with the touch electrode signal. The first driving circuit needs to obtain the pixel electrode signal, and turn off the touch electrode signal at the potential jump position of the pixel electrode signal, making the touch electrode signal avoid the moment the pixel electrode signal is switched between high and low levels.

Figure 14:
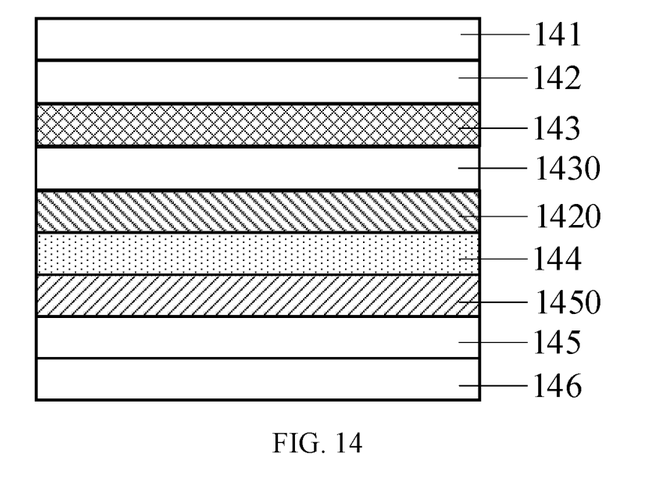
FIG. 14 illustrates a schematic cross-sectional view of a display panel provided by embodiments of the present disclosure.

In some embodiments, the touch electrode layer is located on the first substrate and on a side of the first substrate facing the second substrate. FIG. 14 is a schematic cross-sectional view of a display panel provided by embodiments of the present disclosure. The display panel includes a first substrate (a color filter substrate) 142, a second substrate (a thin film transistor substrate) 145 opposing to the first substrate 142, and a liquid crystal layer 144 between the first substrate 142 and the second substrate 145. The touch electrode layer 143 is located on the first substrate 142 and on a side of the first substrate 142 facing the second substrate 145. Embodiments of the present disclosure does not limit the specific setting of the common electrode and the pixel electrode in the display panel. In addition, the layer order between the touch electrode layer, the common electrode, and the pixel electrode can be set according to the design requirements of the practical product. For example, as shown in FIG. 14, a common electrode layer 1420 is formed on the first substrate 142, a pixel electrode layer 1450 is formed on the second substrate 145. A touch electrode layer 143 is located between the first substrate 142 and the second substrate 145, specifically between the first substrate 142 and the common electrode layer 1420. An insulating layer 1430 is formed between the touch electrode layer 143 and the common electrode layer 1420. The display panel also includes an upper polarizer 141 and a lower polarizer 146. The display panel is an embodiment of the In-cell touch structure. The touch electrode layer 143 is formed on the first substrate 142, and the common electrode layer 1420 is also formed on the first substrate 142. The touch electrode layer 143 is closest to the common electrode layer 1420. Therefore, it is mainly the common electrode signal that interferes with the touch electrode signal. The first driving circuit needs to obtain the common electrode signal and turn off the touch electrode signal at the potential jump position of the common electrode signal, making the touch electrode signal avoid the moment the pixel electrode signal is switched between high and low levels.

It should be noted that, in order to simplify the illustration of the drawings, only some rather than all layers in the display panel are shown in FIG. 13 and FIG. 14.

In some embodiments, the touch electrode layer includes a plurality of self-capacitive touch electrodes. The touch electrode layer includes horizontal and vertical electrode arrays, which respectively form capacitance with respect to the ground line, that is, the capacitance between the electrodes and the ground. When a finger touches a capacitive screen, a finger capacitance will be superimposed on a capacitive screen, increasing the screen capacitance. During a touch detection, a self-capacitive screen detects the horizontal and vertical electrode arrays in sequence, determines the horizontal and vertical coordinates respectively according to the change of capacitance before and after the touch, and forms the touch coordinates of the plane.

In some embodiments, the touch electrode layer includes a plurality of touch driving electrodes and a plurality of touch sensing electrodes that are insulated and intersected with the plurality of touch driving electrodes to form horizontal electrodes and vertical electrodes. Capacitors are formed where the two sets of electrodes intersect, i.e., the two sets of electrodes constitute the two electrodes of the capacitor respectively. When a finger touches the capacitive screen, it affects the coupling between the two electrodes near the touch point, thereby changing the capacitance between the two electrodes. When detecting the mutual capacitance, horizontal touch driving electrodes sequentially send an excitation signal, and all the vertical touch sensing electrodes receive the excitation signal at the same time, by which the capacitance value of intersection points of all horizontal and vertical electrodes can be obtained, which is the two-dimensional capacitance of the entire touch screen. When a finger approaches, the local capacitance reduces. According to data of the two-dimensional capacitance change of the touch screen, the coordinates of each touch point can be calculated. Thus, even there are multiple touch points on the screen, the real coordinates of each touch point can be calculated.

Embodiments of the present disclosure provides a display device, including the display panel. The display device includes all the technical features of the display panel. Thus, the display device can solve the same technical problem and deliver the same technical effect.

Figure 15:
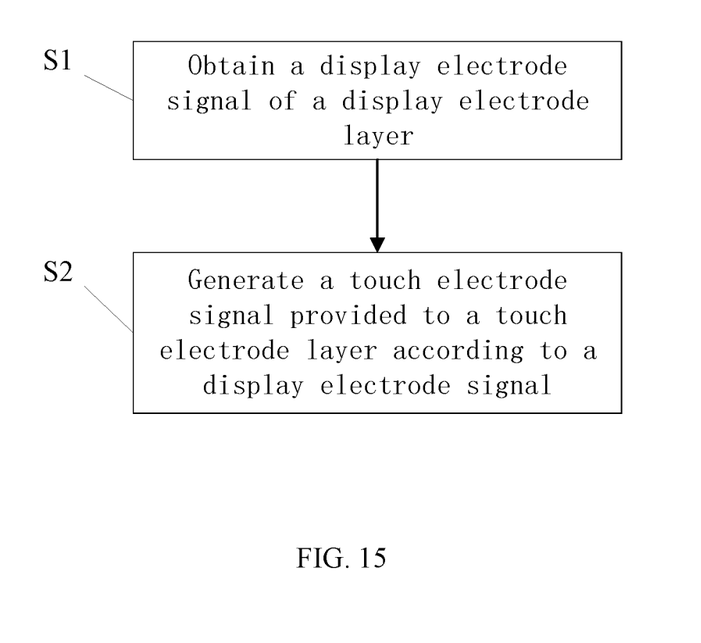
FIG. 15 illustrates a flow chart of a driving method of a display panel provided by embodiments of the present disclosure.

Embodiments of the present disclosure provides a driving method of the display panel, which is applicable to the display panel provided by the foregoing embodiments of the present disclosure. As shown in FIG. 15, the driving method includes the following steps.

S1: Obtain the display electrode signal of the display electrode layer.

The display electrode signal is an AC square wave signal, which is periodically switched between high and low levels. The first driving circuit can obtain the display electrode signal, thereby obtaining the moment the display electrode signal will have a potential jump.

S2: Generate a touch electrode signal provided to the touch electrode layer according to the display electrode signal.

The potential jump position of the display electrode signal is in the off-stage of the touch electrode signal. The first driving circuit turns off the touch electrode signal according to an obtained position where the display electrode signal has a potential jump, making the touch electrode signal avoid the moment display electrode signal is switched between high and low levels and perform the touch scanning only when the display electrode signal is at a stable high level or a stable low level. By this means, the potential jump of the display electrode signal during the display process will not interfere with the touch electrode signal, effectively reducing noise signal interference, improving the touch signal-to-noise ratio, and improving the touch sensitivity.

In some embodiments, the display electrode layer includes a common electrode layer and a pixel electrode layer. The Step S1 includes obtaining the common electrode signal of the common electrode layer and/or the pixel electrode signal of the pixel electrode layer.

Step S2 includes generating the touch electrode signal provided to the touch electrode layer according to the common electrode signal and/or the pixel electrode signal.

The display electrode signal that the first driving circuit needs to obtain includes the common electrode signal that is provided to the common electrode layer, the pixel electrode signal that is provided to the pixel electrode layer, and the common electrode signal and the pixel electrode signal that are obtained by the first driving circuit at the same time. Based on the different internal structures and driving methods of the display panel, in some embodiments, the display panel mainly has the common electrode signal interfere with the touch electrode signal. In some embodiments, the display panel mainly has the pixel electrode signal interfere with the touch electrode signal. In some embodiments, the display panel has both the common electrode signal and the pixel electrode signal interfere with the touch electrode signal.

In some embodiments, Step S2 further includes generating the touch electrode signal, whose on-stage is in the high-level stage and/or the low-level stage of the display electrode signal according to the display electrode signal.

The touch electrode signal can adopt a variety of different driving methods. The touch electrode signal can be applied to the display electrode signal during both the high and low-level stages of the display electrode signal, only during the high-level stage of the display electrode signal, or only during the low-level stage of the display electrode signal. The touch electrode signal only needs to avoid the moment the display electrode signal is switched between high and low potentials.

In some embodiments, the touch electrode layer includes a plurality of self-capacitive touch electrodes. Step S2 includes generating the touch electrode signal that is provided to the respective capacitive touch electrodes according to the display electrode signal. The touch electrode signal is input to the horizontal electrode array and the vertical electrode array of the touch electrode layer, making the horizontal electrode array and the vertical electrode array respectively form a capacitance with respect to the ground.

In some embodiments, the touch electrode layer includes a plurality of touch driving electrodes and a plurality of touch sensing electrodes that are insulated and intersected with the plurality of touch driving electrodes. Step S2 includes generating the touch electrode signal that is provided to each touch driving electrode according to the display electrode signal. An excitation signal is sent to horizontal touch driving electrodes in sequence, during which vertical touch sensing electrodes receive the excitation signal at the same time to detect whether a capacity of each self-capacitor changes and a finger is touching the screen.

In some embodiments, the display panel includes a display electrode connection line, and the display electrode layer is electrically connected to the first driving circuit through the display electrode connection line. Step S1 includes obtaining the display electrode signal of the display electrode layer through the display electrode connection line. Through the display electrode connection line, the first driving circuit can obtain the display electrode signal of the display electrode layer in real time, turning off the touch electrode signal at the potential jump position of the display electrode signal and making the touch electrode signal avoid the moment the display electrode signal is switched between high and low levels.

In some embodiments, the display panel further includes a display driving circuit electrically connected to the first driving circuit. Step S1 includes obtaining the display electrode signal of the display electrode layer through the display driving circuit. The display driving circuit can synchronize the display electrode signal to the first driving circuit. The first driving circuit can obtain the moment when the potential jump of the display electrode signal will occur, by which the first driving circuit turns off the touch electrode signal at the potential jump position of the display electrode signal, making the touch electrode signal avoid the moment the display electrode signal is switched between high and low levels.

As disclosed, technical solutions provided by the present disclosure have the following advantages. The display panel provided by the present disclosure includes a first driving circuit, a display electrode layer, and a touch electrode layer. The first driving circuit is configured to obtain the display electrode signal of the display electrode layer and generate the touch electrode signal that is provided to the touch electrode layer, according to the display electrode signal. The potential jump position of the display electrode signal is in the off-stage of the touch electrode signal. According to the obtained display electrode signal, the touch electrode signal can be turned off at the potential jump position of the display electrode signal, making the touch electrode signal avoid the moment when the display electrode signal is switched between high and low potentials, which avoids an interference to the touch electrode signal by the potential jump of the display electrode signal during the display process. Therefore, noise signal interference can be effectively reduced, the touch signal-to-noise ratio can be improved, and touch sensitivity can be enhanced.

Correspondingly, the display device and the driving method of the display panel provided by the present disclosure also have the technical effects mentioned above.

The terms such as "first" and "second" are used merely to distinguish one entity or operation from another entity or operation, and do not necessarily require or imply any actual relationship or order between these entities or operations. Additionally, the terms "comprising", "including", or any other variant thereof, are intended to encompass a non-exclusive inclusion, such that a process, method, article, or apparatus comprising a series of elements includes not only those elements explicitly listed, but also include other elements that are not explicitly listed but are inherent to such process, method, article, or apparatus. In the absence of further limitations, an element defined by a statement that includes the term "comprising" does not exclude the presence of additional identical elements in a process, method, article, or apparatus that includes the element.

The above description is only a specific implementation of the present disclosure, but the scope of protection of the present disclosure is not limited thereto. Any persons of ordinary skill in the art familiar with the technical field of the present disclosure can easily conceive various equivalent modifications or substitutions within the scope of the technology disclosed in the present disclosure, and such modifications or substitutions should be covered within the scope of protection of the present disclosure. Therefore, the scope of protection of the present disclosure should be determined by the scope of protection of the claims.

What is claimed is:

1. A display panel, comprising:
   a first driving circuit;
   a display electrode layer; and
   a touch electrode layer, wherein
     the first driving circuit obtains a display electrode signal from the display electrode layer and generates a touch electrode signal provided to the touch electrode layer according to the display electrode signal;
     the first driving circuit turns off the touch electrode signal at a rising edge and a falling edge of the display electrode signal, causing the touch electrode signal to avoid a moment when the display electrode signal is switched between high and low potentials, thereby a potential jump of the display electrode signal during a display process does not affect the touch electrode signal; and
     in at least one half cycle of the display electrode signal during a display state of the display panel, except the moment when the display electrode signal is switched between high and low potentials, the first driving circuit turns on the touch electrode signal while the first driving circuit turns on the display electrode signal.

2. The display panel of claim 1, wherein
   the display electrode layer comprises a common electrode layer and a pixel electrode layer; and
   the display electrode signal comprises a common electrode signal provided to the common electrode layer and/or a pixel electrode signal provided to the pixel electrode layer.

3. The display panel of claim 2, wherein
   the pixel electrode layer comprises a plurality of first electrodes configured to form a first pattern;
   the common electrode layer comprises a plurality of second electrodes configured to form a second pattern; and
   an overlapping area of the plurality of first electrodes and the plurality of second electrodes defines a preset display icon.

4. The display panel of claim 2, wherein
   the pixel electrode layer comprises a plurality of first electrodes extending along a first direction;
   the common electrode layer comprises a plurality of second electrodes extending along a second direction;
   the first direction intersects the second direction; and
   an overlapping area of the plurality of first electrodes and the plurality of second electrodes defines a pixel unit.

5. The display panel of claim 2, wherein
   the display panel comprises a plurality of pixel units arranged in a matrix;
   the pixel unit comprises a pixel circuit;
   the pixel unit comprises a common electrode of the common electrode layer and a pixel electrode of the pixel electrode layer; and
   the pixel electrode receives the pixel electrode signal through the pixel circuit.

6. The display panel of claim 2, wherein the first driving circuit is configured to control an on-stage of the touch electrode signal in a high-level stage and/or a low-level stage of the display electrode signal.

7. The display panel of claim 1, wherein
   the display panel comprises a first substrate and a second substrate opposing to the first substrate;
   a liquid crystal layer is located between the first substrate and the second substrate; and
   the touch electrode layer is located on one side of the first substrate, away from the second substrate.

8. The display panel of claim 1, wherein
   the display panel comprises a first substrate and a second substrate opposing to the first substrate;
   a liquid crystal layer is located between the first substrate and the second substrate; and
   the touch electrode layer is located between the first substrate and the second substrate.

9. The display panel of claim 1, wherein the touch electrode layer comprises a plurality of self-capacitive touch electrodes.

10. The display panel of claim 1, wherein the touch electrode layer comprises a plurality of touch driving electrodes, and a plurality of touch sensing electrodes that are insulated and intersected with the plurality of the touch driving electrodes.

11. The display panel of claim 2, wherein
    the display panel comprises a display electrode connection line;
    the display electrode layer is electrically connected to the first driving circuit through the display electrode connection line; and
    the first driving circuit obtains the display electrode signal of the display electrode layer through the display electrode connection line.

12. The display panel of claim 11, wherein
    the display electrode connection line comprises a common electrode signal line; and
    the common electrode layer is electrically connected to the first driving circuit through the common electrode signal line.

13. The display panel of claim 11, wherein
    the display electrode connection line comprises a pixel electrode signal line; and
    the pixel electrode layer is electrically connected to the first driving circuit through the pixel electrode signal line.

14. The display panel of claim 1, further comprising a second driving circuit, wherein
    the second driving circuit is electrically connected to the first driving circuit; and the first driving circuit obtains the display electrode signal of the display electrode layer through the second driving circuit.

15. A display device, comprising:
a display panel comprising a first driving circuit, a display electrode layer, and a touch electrode layer, wherein
the first driving circuit obtains a display electrode signal from the display electrode layer and generates a touch electrode signal provided to the touch electrode layer according to the display electrode signal;
the first driving circuit turns off the touch electrode signal at a rising edge and a falling edge of the display electrode signal, causing the touch electrode signal to avoid a moment when the display electrode signal is switched between high and low potentials, thereby a potential jump of the display electrode signal during a display process does not affect the touch electrode signal; and
in at least one half cycle of the display electrode signal during a display state of the display panel, except the moment when the display electrode signal is switched between high and low potentials, the first driving circuit turns on the touch electrode signal while the first driving circuit turns on the display electrode signal.

16. A driving method of a display panel, wherein the display panel comprises a first driving circuit; a display electrode layer; and a touch electrode layer, and the driving method comprises:
obtaining, by the first driving circuit, a display electrode signal of the display electrode layer; and
generating, by the first driving circuit, a touch electrode signal provided to the touch electrode layer according to the display electrode signal,
wherein:
the first driving circuit turns off the touch electrode signal at a rising edge and a falling edge of the display electrode signal, causing the touch electrode signal to avoid a moment when the display electrode signal is switched between high and low potentials, thereby a potential jump of the display electrode signal during a display process does not affect the touch electrode signal; and
in at least one half cycle of the display electrode signal during a display state of the display panel, except the moment when the display electrode signal is switched between high and low potentials, the first driving circuit turns on the touch electrode signal while the first driving circuit turns on the display electrode signal.

17. The driving method of claim 16, wherein
the display electrode layer comprises a common electrode layer and a pixel electrode layer;
obtaining, by the first driving circuit, the display electrode signal of the display electrode layer comprises: obtaining, by the first driving circuit, a common electrode signal of the common electrode layer and/or a pixel electrode signal of the pixel electrode layer; and
generating, by the first driving circuit, the touch electrode signal provided to the touch electrode layer according to the display electrode signal comprises:
generating, by the first driving circuit, the touch electrode signal provided to the touch electrode layer according to the common electrode signal and/or the pixel electrode signal; and
generating, by the first driving circuit according to the display electrode signal, the touch electrode signal whose on-stage is in an high-level stage and/or an low-level stage of the display electrode signal.

18. The driving method of claim 16, wherein
the touch electrode layer comprises a plurality of self-capacitive touch electrodes;
generating, by the first driving circuit, the touch electrode signal provided to the touch electrode layer according to the display electrode signal comprises: generating, by the first driving circuit, the touch electrode signal provided to each of the plurality of self-capacitive touch electrodes according to the display electrode signal;
the touch electrode layer further comprises a plurality of touch driving electrodes, and a plurality of touch sensing electrodes that are insulated and intersected with the plurality of touch driving electrodes; and
generating, by the first driving circuit, the touch electrode signal provided to the touch electrode layer according to the display electrode signal comprises: generating, by the first driving circuit, the touch electrode signal provided to each of the plurality of touch driving electrodes according to the display electrode signal.

19. The driving method of claim 16, wherein
the display panel comprises a display electrode connection line;
the display electrode layer is electrically connected to the first driving circuit through the display electrode connection line; and
obtaining, by the first driving circuit, the display electrode signal of the display electrode layer comprises: obtaining, by the first driving circuit, the display electrode signal of the display electrode layer through the display electrode connection line.

20. The driving method of claim 16, wherein
the display panel further comprises a display driving circuit;
the display driving circuit is electrically connected to the first driving circuit; and
obtaining, by the first driving circuit, the display electrode signal of the display electrode layer comprises: obtaining, by the first driving circuit, the display electrode signal of the display electrode layer through the display driving circuit.

* * * * *